United States Patent [19]

Mulleavy et al.

[11] Patent Number: 4,776,872
[45] Date of Patent: Oct. 11, 1988

[54] METHOD AND COMPOSITION FOR ENHANCING MUSHROOM GROWTH

[75] Inventors: Perry Mulleavy, Aptos, Calif.; W. B. Raymer, Friday Harbor, Wash.; Kevin J. Andres, Bonne Terre, Mo.; Thomas G. Patton, E. Lansing, Mich.; Donald W. Protheroe, Jr., Farmington, Mo.; Robert W. Paskewitz, Huntsville, Tex.

[73] Assignee: Monterey Mushrooms, Inc., Watsonville, Calif.

[21] Appl. No.: 781,964

[22] Filed: Sep. 30, 1985

[51] Int. Cl.$^4$ .......................... C05G 3/00; A01G 1/04
[52] U.S. Cl. ............................................ 71/5; 47/1.1; 426/532; 426/634
[58] Field of Search .................. 71/5; 47/1.1; 426/331, 426/335, 532, 634

[56] References Cited

U.S. PATENT DOCUMENTS

| | | | |
|---|---|---|---|
| 3,942,969 | 3/1976 | Carroll, Jr. et al. | 71/5 |
| 4,370,159 | 1/1983 | Holtz | 71/5 |
| 4,420,319 | 12/1983 | Holtz | 71/5 |
| 4,421,543 | 12/1983 | Holtz | 71/5 |
| 4,534,781 | 8/1985 | Wu et al. | 71/5 |

FOREIGN PATENT DOCUMENTS

| | | | |
|---|---|---|---|
| 0035147 | 9/1978 | Japan | 71/5 |
| 0045524 | 11/1980 | Japan | 71/5 |

OTHER PUBLICATIONS

Markley, "Soybeans and Soybean Products", pp. 498-501, 1018-1019, (1950).
Soybeans: Chemistry and Technology Smith, p. 67, 1978.
Dijkstra, F., et al., "Submerged Growth of the Cultivated Mushroom, *Agaricus bisporus*," Antonie van Leeuwenhoek, vol. 38, pp. 329-340 (1972).
Haskins, R. H., et al., "Steroids and the Stimulation of Sexual Reproduction of a Species of Pythium," Canadian Journal of Microbiology, vol. 10, pp. 187-195 (1964).
Gooday, G. W., "Fungal Sex Hormones," Reprinted from *Annual Review of Biochemistry*, vol. 43, pp. 35-49 (1974).
Klemmer, H. W., et al., "Lipids Stimulating Sexual Reproduction and Growth in Pythiaceous Fungi," *Phytopathology*, vol. 55, pp. 320-323 (Mar. 1965).
Elliott, C. G., et al., "A Steriod Growth Factor Requirement in a Fungus," *Nature*, vol. 203, No. 4943, pp. 427-428 (Jul. 25, 1964).
Haskins, R. H., "Morphology, Nutrition, and Host Range of a Species of Pythium," *Canadian Journal of Microbiology*, vol. 9, pp. 451-457 (1963).
Lehrian, D. W., et al., "The Effects of Linoleate and Acetate on the Growth and Lipid Composition of Mycelium of *Agaricus bisporus*," *Mycologia*, vol. 68, pp. 453-462 (1976).
Schisler, L. C., "Stimulation of Yield in the Cultivated Mushroom by Vegetable Oils," *Applied Microbiology*, vol. 15, No. 4, pp. 844-850 (Jul. 1967).

List continued on next page.

*Primary Examiner*—Ferris H. Lander
*Attorney, Agent, or Firm*—Klarquist, Sparkman, Campbell, Leigh & Whinston

[57] ABSTRACT

A mushroom growth enhancer is provided consisting of a cracked soybean product in combination with a preservative agent. The cracked soybean product is size-adjusted to −10+30 U.S. standard mesh and dehulled. The dehulled, size-adjusted product is then combined with a preservative agent. The resulting combination is pasteurized at 220° F. for 5 minutes. After pasteurization, excess water is evaporated to prevent spoilage by microorganisms not destroyed during pasteurization. After water evaporation, the resulting product is rapidly cooled. Rapid cooling prevents denaturation of the soybean protein. Because the present invention consists of a substantially undenatured protein product, the use of adversely high temperature conditions and harmful chemical denaturants is not required. Instead, the combination of reduced particle size, pasteurization, preservative agent addition, and dehulling result in a product effectively used as a nutrient source by growing mushrooms, while eliminating the use thereof by undesired foreign microorganisms.

13 Claims, 2 Drawing Sheets

OTHER PUBLICATIONS

Wardle, K. S., et al., "The Effects of Various Lipids on Growth of Mycelium of Agaricus Bisporus, *Mycologia*, vol. 61, pp. 305–315 (1969).

Schisler, L. C., et al., "Stimulation of Yield in the Cultivated Mushroom by Vegetable Oils," *J. Agr. Food Chem.*, vol. 18, No. 6, pp. 1102–1103 (1970).

Sinden, J. W., et al., "Nutrient Supplementation of Mushroom Compost at Casing," reprinted from *Mushroom V*, pp. 267–280 (1962).

Schisler, L. C., et al., "Nutrient Supplementation of Mushroom Compost at Spawning," Reprinted from *Mushroom V*, pp. 150–164 (1962).

Wolf, W. J., et al., *Soybeans as a Food Source*, CRC Press, Boca Raton, Florida, pp. 25–41 (1975).

Altschul, A. M., et al., *New Protein Foods*, Academic Press, Inc., New York, N.Y., vol. 5, pp. 129–144 (1985).

Gaughran, E. R. L. and P. M. Borick, *Sterilization, Disinfection, and Antisepsis*, Handbook of Microbiology, vol. 1, Organismic Microbiology, A. I. Laskin and H. A. Lechevalier (Eds.), CRC Press, Boca Raton, pp. 653–660 (1973).

Gray, W. D., *The Use of Fungi as Food and in Food Processing*, CRC Press, Boca Raton, pp. 19–20 (1970).

Ramsbottom, J., *Mushrooms and Toadstools*, Collins Clear-Type Press, London and Glasgow, pp. 65–67 (1953).

Weete, J. D., *Lipid Biochemistry of Fungi and Other Organisms*, Plenum Press, New York and London, pp. 312–317 (1980).

Schisler & Sinden, *Nutrient Supplementation of Mushroom Compost at Casing—Vegetable Oils*, Can. J. Bot. 44, 1063–1069 (1966).

◇ — 0% PRESERVATIVE
△ — 1.6 %
X — 3.2 %

METHOD AND COMPOSITION FOR ENHANCING MUSHROOM GROWTH

BACKGROUND OF THE INVENTION

The present invention relates to mushroom growth enhancing materials, and more particularly to a mushroom growth enhancer consisting of a substantially undenatured, sized, and pasteurized particulate soybean product in combination with a preservative agent.

The production and cultivation of the commercial mushroom *Agaricus bisporus* originated in France at the beginning of the 17th century. At that time, most of the cultivation occurred outdoors. Later, it was discovered that superior results were obtainable by growing the mushroom in caves. The caves provided a cool, consistent environment. As mushroom cultivation techniques developed, the production of *A. bisporus* using greenhouses increased in popularity. The greenhouses provided a growth environment in which temperature and humidity could be controlled.

Although the biological and chemical systems of the commercial mushroom are complex, agricultural scientists have developed growth methods for improving mushroom yield and quality. The basic stages of mushroom cultivation most commonly used today are as follows:

a. Composting—Composting consists of two stages referred to as phase 1 and phase 2. Phase 1 involves the preparation of compost material for growing the mushrooms. A variety of different materials can be used to make the compost. A preferred compost is prepared by mixing straw materials with protein meal, cottonseed hulls, gypsum, and water and allowing the mixture to ferment by action of the microflora, molds, and bacteria therein. In phase 2, the fermented mixture is placed into trays, and treated to convert free ammonia and other nitrogenous compounds into microbial protein. The treated mixture is then pasteurized to eliminate insects and foreign molds. Preparation of the compost as described above usually takes from 20-30 days.

b. Spawn Run—In this stage, the compost is inoculated with spawn (mushroom seed) and the resulting mycelium allowed to grow for approximately 14 days. The term "mycelium" refers to a mass of branched filaments produced by the growing mushroom.

c. Case Holding—After the spawn run period is completed, a mixture of peat moss, limestone, and water is blended and layered on top of the compost. The mycelium grows up through this casing layer and fruiting is initiated by reducing the temperature and carbon dioxide levels of the growing environment.

d. Production—Once fruiting has started, mushroom production will occur in "breaks" or "flushes" which are usually one week apart. Most mushroom growing facilities will harvest four breaks (28 days) before discarding the compost.

To enhance the above-described mushroom growth process, research has been directed to the formulation of a growth supplement. Testing has shown that supplementation can be undertaken at either the spawn run or case holding phases of growth. Research concerning the supplementation of growing mushrooms was first described by L. C. Schisler and J. W. Sinden in articles entitled, "Nutrient Supplementation of Mushroom Compost at Spawning," *Mushroom Science* 5, 150-164 (1962) and "Nutrient Supplementation of Mushroom Compost at Casing," *Mushroom Science* 5, 267-280 (1962.) According to these articles, an increase in mushroom growth is obtainable by incorporating various proteinaceous materials into the compost, including cottonseed meal, soybean meal, and dried skim milk. Increases in yield using these materials are attributed to their relatively high nitrogen concentrations.

Additional research on mushroom supplementation involved the addition of vegetable lipids (fatty materials) to mushroom compost. The following articles describe research in which vegetable lipids were studied as mushroom growth enhancers: Schisler, L. C. and J. W. Sinden, "Nutrient Supplementation of Mushroom Compost at Casing—Vegetable Oils," *Can. J. Bot.* 44, 1063-1069 (1966); Schisler, L. C., "Stimulation of Yield in the Cultivated Mushroom by Vegetable Oils," *Appl. Microbiol.* 15, 844-850 (1967); and Schisler, L. C. and T. G. Patton, Jr., "Stimulation of Yield in the Cultivated Mushroom by Vegetable Oils: Effect of Sterols and Ethyl Linoleate," *Agric. Food Chem.* 18, 1102-1103 (1970).

However, a need remained for a mushroom growth enhancer usable on a large, commercial scale. To be commercially feasible, a growth stimulant must be capable of adding nutrients to the growing mushroom crop without stimulating the growth of competing microorganisms, including bacteria and molds. The growth of competing microorganisms reduces the yield and quality of the mushroom crop. Furthermore, competing microorganisms produce respiratory heat which raises the temperature of the compost to undesirably high levels. High temperatures (approximately 90° F. or above) drastically inhibit the growth of spawn and mushroom mycelium.

To solve this problem, research has been directed to mushroom growth supplements designed to prevent the growth of competing microorganisms. For example, U.S. Pat. No. 3,942,969 to Carroll, Jr. et al. describes a nutrient composition for mushrooms using a denatured proteinaceous material. Preferred proteinaceous materials include fish meal, malt sprouts, brewers yeast products, casein, wheat germ, sunflower seed, corn glutin, cottonseed protein, soybean protein, and peanut protein. In accordance with the patent, the protein may be denatured by heating or by reacting it with formaldehyde, acids, or alkali materials. Denaturation helps prevent competing microorganisms from using the protein as a food source, especially early in the spawn run phase. However, the mushroom mycelium can utilize the denatured protein by resolubizing it from its insoluble, denatured form. The precise mechanism used by the mushrooms to resolubize the protein is not known.

Another nutrient supplement is described in U.S. Pat. Nos. 4,370,159 and 4,421,543 to Holtz. The supplement described in these patents consists of a matrix material having a plurality of chemical growth enhancer droplets embedded therein. A preferred matrix material consists of anhydrous, denatured soybean meal, denaturation being accomplished using formaldehyde and heat. The enhancer droplets preferably consist of a vegetable oil core having an activated soybean protein coat.

The present invention represents an improvement over the above-described inventions. Formaldehyde is an environmentally dangerous and potentially carcinogenic compound. Its use in an agricultural formulation for growing food products is undesirable. By varying and optimizing other factors, including particle size, preparation temperature, and the addition of non-denaturing preservative compounds, the present invention eliminates the need for denaturing the protein supplement using formaldehyde or other methods. As a result, a low-cost, effective, and environmentally safe mushroom growth enhancer is produced, as described in detail below.

SUMMARY OF THE INVENTION

An object of the present invention is to provide a mushroom growth enhancer capable of increasing the yield and viability of commercial mushrooms.

Another object of the present invention is to provide a mushroom growth enhancer which is not available to competing foreign microorganisms as a food source while fostering the propagation of commercial mushrooms.

Another object of the present invention is to provide a mushroom growth enhancer which is economical to manufacture and use.

Another object of the present invention is to provide a mushroom growth enhancer manufactured from readily available, safe materials.

Another object of the present invention is to provide a mushroom growth enhancer which is easily manufactured using a minimum number of process steps.

A further object of the present invention is to provide a mushroom growth enhancer effective at low concentration levels.

A still further object of the present invention is to provide a mushroom growth enhancer avoiding the use of substantially denatured protein materials.

To implement these objects, a mushroom growth enhancer is provided consisting of a cracked/ground soybean product in combination with a preservative agent. The cracked soybean product is size-adjusted to $-10+30$ U.S. standard mesh and dehulled. The dehulled, size-adjusted product is then combined with a preservative agent. Next, the resulting combination is pasteurized at 220° F. for five minutes. After pasteurization, excess water is evaporated to prevent spoilage by microorganisms not destroyed during pasteurization. After water evaporation, the product is rapidly cooled. Rapid cooling prevents denaturation of the soybean protein. Because the invention consists of a substantially undenatured protein product, the use of adversely high temperature conditions and harmful chemical agents, including formaldehyde, is not required. Instead, the combination of reduced particle size, pasteurization, preservative agent addition, and dehulling results in a mushroom growth product having both delayed availability and nutritive properties.

BRIEF DESCRIPTION OF THE DRAWINGS

FIG. 4 is a temperature profile of the growth enhancer of the invention during the pasteurization/cooling phases of

DETAILED DESCRIPTION OF A PREFERRED EMBODIMENT

Figure 1:
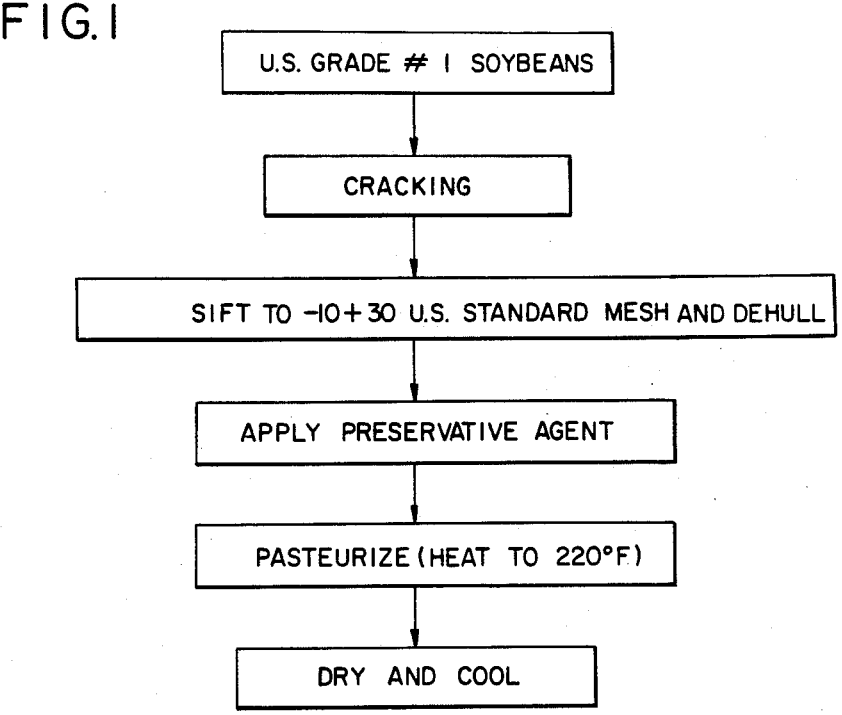
FIG. 1 is a flow diagram showing the basic sequence of steps used to prepare the growth enhancer of the present invention.

The mushroom growth enhancer of the present invention is preferably prepared according to the basic sequence of steps shown in FIG. 1. The process begins with the selection of raw soybeans (U.S. Grade No. 1.), preferably containing not more than 13% moisture by weight, and not more than 1% foreign materials and/or colored beans by weight. The term "colored beans" refers to beans damaged through insect infestation or extreme environmental storage conditions. Beans having the above-described characteristics provide a clean, nutritionally-consistent raw starting material.

Next, the whole soybeans are cracked in a roller mill (RossKamp Series 6.5 or equivalent.) The cracked soybeans are then sifted using a screening separator (Ferrell Ross Model Super 68A or equivalent) to a particle size of $-10+30$ U.S. standard mesh. This particle size is required for two reasons. First, large particles ($+10$) have a small surface-to-volume ratio and are not as widely distributed through the mushroom compost in comparison with smaller particles added on an equivalent weight basis. The lack of wide distribution through the compost limits availability of the nutrient materials to the growing mushrooms. Second, flour/meal type ($-30$) particles are not suitable since their large surface-to-volume ratio results in an extensive distribution of the material throughout the compost. Such a distribution enables rapid utilization of the particles by competing microorganisms, including bacteria and foreign molds.

During the sifting process, hulls are pneumatically separated from the cracked soybean product. The removal of hulls reduces the overall carbohydrate content of the product. Carbohydrate materials are a key growth stimulant for undesired foreign microorganisms. The removal of carbohydrates therefore limits the propagation of such organisms. Also, the removal of carbohydrates increases the protein content and resulting potency of the product per unit weight.

At this stage in the manufacturing process, the dehulled product is analyzed to determine if the product contains particles no larger or smaller than $-10+30$ U.S. standard mesh (plus or minus 5%.) The product is also tested to ensure that it has: (1) not more than 2% hulls by weight; (2) not more than 1.75% foreign material, seeds, and/or colored beans by weight; and (3) no insect, worm, or nematode infestation.

If the product meets the above standards, it is transferred to a mixer unit (Forberg Model C200-SS-2D or equivalent.) In the mixer unit, the product is combined with a preservative agent. Preferred preservative agents include copper-containing, carbamate, phenolic, and antibiotic compounds, specific examples of which are as follows:

1. Copper-Containing Materials

Copper sulfate alone or in combination with lime.

2. Carbamate Materials

Methyl 1 - (butylcarbamoyl)-2-benzimidazolecarbamate; zinc ethylenebisdithiocarbamate.

3. Phenolic Materials o-Phenylphenol; o-Benzyl-para-chlorophenol, and salts thereof.

4. Antibiotic Materials

Streptomycin; Terramycin.

The selected agent is added in an amount effective to preserve the product from foreign microbial activity while in the compost, but not so much as to prevent utilization of the same by the mushroom mycelium.

Figure 2:
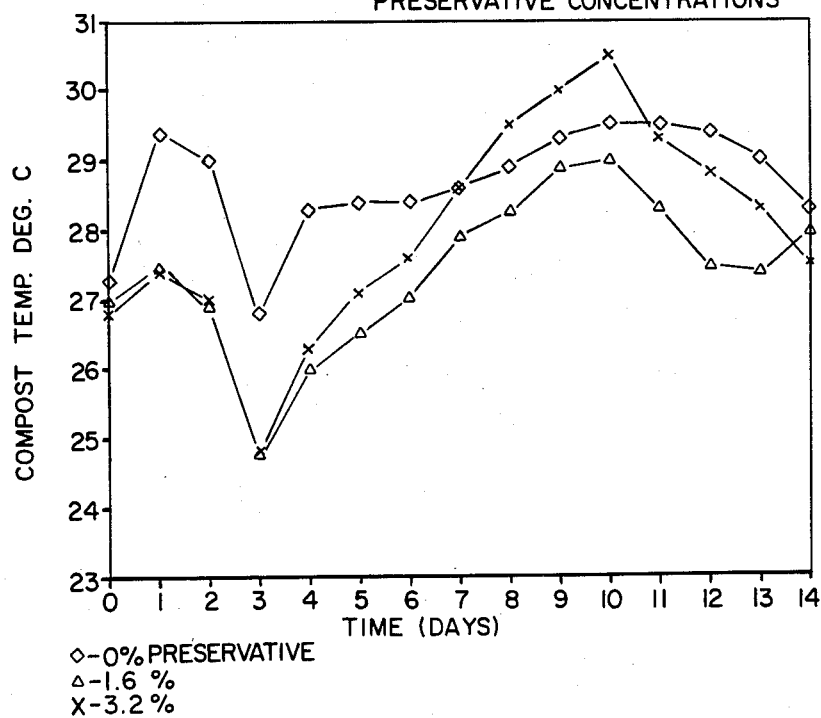
FIG. 2 is a graphical representation of the effects of a preservative agent on compost temperature when applied to the soybean materials of the present invention.

A preferred preservative agent is a sodium salt of o-Phenylphenol (o-Phenylphenate tetrahydrate) sold by The Dow Chemical Company of Midland, Michigan under the registered trademark Dowicide A. Dowicide A is an EPA registered chemical (No. 464-78) for use in post-harvest applications to a variety of agricultural products. It is not classified as a sterilant like formaldehyde because it is not active against certain bacterial spores. However, the pasteurization/evaporation steps described below effect the elimination of many such spores. FIG. 2 graphically shows the effects of Dowicide A as applied to the soybean materials of the present invention. In FIG. 2, soybean materials with 0%, 1.6%, and 3.2% Dowicide A were plotted against temperature. High temperatures signify increased foreign microbial activity. As shown in the figure, the highest average temperatures result when no Dowicide A is used.

The Dowicide A may be present in an amount from 0.5 to 1.5% by weight of the soybean materials. The optimum concentration of Dowicide A in the present invention is approximately 1.25% by weight. For an 80 pound portion of soybean materials, a solution of 1 pound Dowicide A and 1,088 ml of water would be combined. Application of the Dowicide A is preferably accomplished using a unijet atomizing nozzle system (Spray System Company ¼ LN4 or equivalent) at about 100 psi for approximately 35 seconds with agitation. An additional mixing time of approximately 30 seconds thereafter is preferred. The additional mixing ensures uniform incorporation of the preservative solution into the soybean particles. In effecting the combination of soybean particles and preservative agent, it is preferred that both be combined in a batch process mode, as opposed to a continuous mode. Batch processing offers maximum control over the application and ultimate concentration of preservative agent in the soybean particles.

The remaining process steps are most effectively accomplished in a continuous mode. The next step involves pasteurizing the product. To accomplish pasteurization, the product is heated in a dryer apparatus (Nara Paddle Dryer Model 1.6W or equivalent.) The dryer is operated to raise the temperature of the product from an ambient level to 220° F in approximately 5 minutes. Using the Nara Paddle Dryer Model 1.6W, this occurs through the injection of 95 psi of steam at approximately 325° F. Pasteurization is essential in accomplishing the following objectives: (1) the reduction of vegetative bacteria and mold plate count by at least three logs; (2) the inactivation of mesophilic bacterial spores; and (3) the inactivation of lipoxygenase. However, the above-described amount of heat is insufficient to substantially denature the product. As a result of pasteurization, the possibility of early and undesired heat generation by foreign microorganisms during the spawn run is minimized. The importance of pasteurization is shown in Table 1 which represents a comparison of pre- and post-microbial levels for a batch of the present invention prepared and pasteurized as described above.

TABLE 1

| Assay | Untreated Product | Pasteurized Product |
|---|---|---|
| *TPC Bacteria | $2.3 \times 10^6$ | $4.5 \times 10^2$ |
| Molds | 400 | less than 10 |
| Yeast | 30 | less than 10 |

*TPC = Total Plate Count

Figure 3:
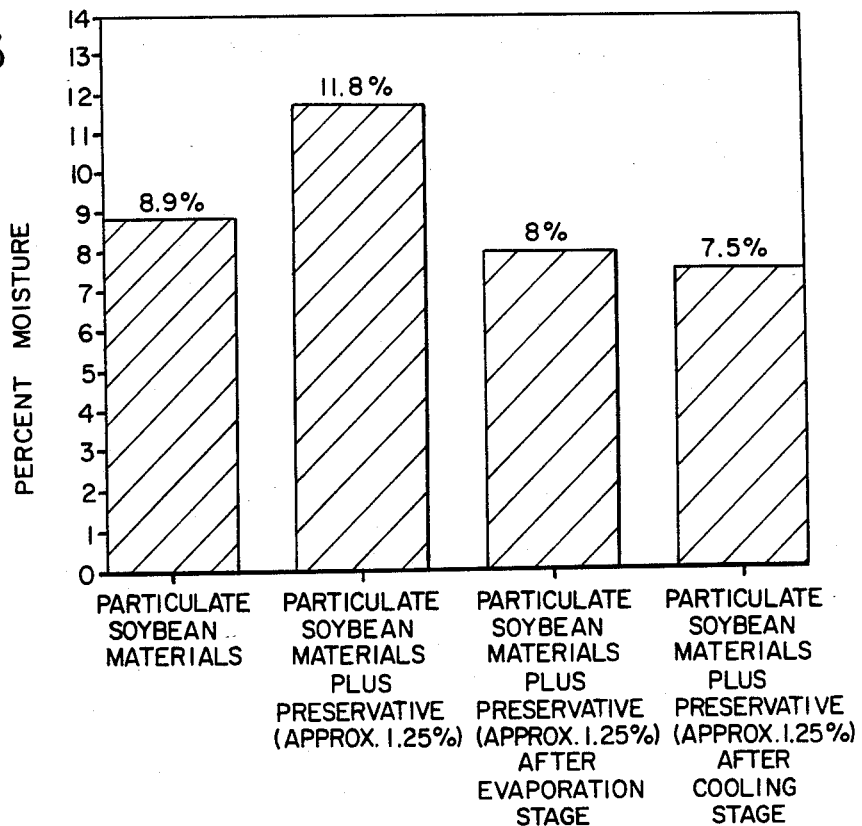
FIG. 3 is a graphical representation of the changes in moisture content of the cracked soybeans during preparation of the enhancer.
Figure 4:
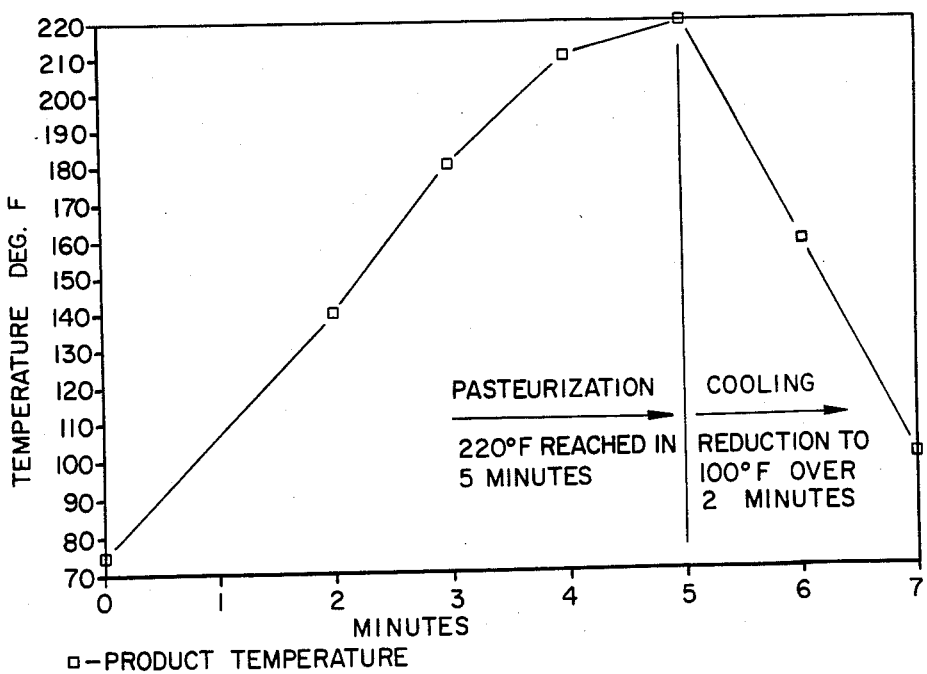

After pasteurization is completed, the product is transferred to a cooler/evaporator unit preferably consisting of a vibrating fluidized bed conveyor (Jeffrey Dresser Industies, Model 1X10 TMV or equivalent.) In the present embodiment, the cooler/evaporator unit uses ambient, filtered air at 2500 CFM to lower the product temperature from 220° F. to 100° F. in approximately 1-2 minutes. After cooling in this manner, the product has a moisture level of approximately 7.5%. FIG. 3 graphically shows the changes in moisture content of the product during the above-described processes. FIG. 4 represents a temperature profile of the product during the pasteurization/cooling phases.

Evaporation of water from the product as described above prevents spoilage by microorganisms not killed during pasteurization, including bacterial spores. Rapid cooling to 100oF in 1-2 minutes serves two important purposes. First, protein denaturation is proportional to the amount of time a product is maintained at a high temperature. Cooling of a protein product at a rapid rate minimizes the likelihood of substantial protein denaturation.

The resulting final product represents an effective mushroom growth enhancer comprised of substantially undenatured protein materials. Denaturation involves a modification of the tertiary or quaternary structure of a protein. As a result, the physical and biological properties of the protein are changed. The term "substantially undenatured" as used herein is reflected by an index called "PDI" or "protein dispersibility index." Taking PDI measurements involves extracting the soybean product with water and analyzing the extracted portion using Kjeldahl analysis. In conducting Kjeldahl analysis, the product is digested with concentrated $H_2SO_4$ which converts combined nitrogen in the product to ammonium sulfate. The resulting solution is then treated with alkaline materials, causing the liberation of ammonia. The amount of ammonia liberated is determined by titration with standard acid. The results of the titration can then be used to calculate the amount of nitrogen in the product. To calculate PDI, the following formula is used:

$$+PDI = \frac{\% WDP \times 100}{\% \text{ total nitrogen in sample (from Kjeldahl analysis)} \times 6.25}$$

$$\left[ WDP = \frac{\text{ml alkali} \times N \times 0.014 \times 100 \times 6.25}{\text{wt. of sample}} \right]$$

$N$ = normality of alkali; 0.014 = milliequivalent wt. of nitrogen; 6.25 = nitrogen-to-protein conversion factor
+Based on AOCS method Ba 10-65

In the present application, a "substantially undenatured" protein is characterized as that having a PDI not less than 50, as calculated above. PDI analyses of the present invention have indicated a PDI level of approximately 65-75. The PDI of a commercially available product using formaldehydedenatured soybean material was analytically determined to be approximately 11.4.

The present invention may be used immediately after preparation, or bagged and stored in a dry, cool location for later use. In use, the product is uniformly combined with compost, preferably at the spawning phase of mushroom cultivation. To ensure maximum results, the combined compost/growth enhancer product is maintained within a temperature range of 75°-85° F. during the 14 day spawn run. Temperatures outside of this range, especially above 90° F., frequently result in substantial losses of yield and quality. It has been determined that ideal results are obtained when the mushroom growth enhancer is added to the compost in an amount consisting of approximately 3.5% dry by weight of the compost, but may be present between 2 and 5% (dry weight) of the compost.

Shown in Table 2 below is a proximate analysis of the soybean growth enhancer prepared as described above:

TABLE 2

| Assay | Analysis | Units |
|---|---|---|
| Protein (N × 6.25) | 38.4 | G/100 G |
| Moisture | 10.0 | G/100 G |
| Fat | 21.6 | G/100 G |
| Ash | 4.6 | G/100 G |
| Crude Fiber | 2.5 | G/100 G |
| Carbohydrates | 31.4 | G/100 G |
| Calories | 397 | Calories/100 G |
| Protein Dispersibility Index | 74.2 | |

EXAMPLE

To demonstrate the effectiveness of the present invention as a mushroom growth enhancer, tests were conducted comparing the invention with a commercially available formaldehyde-based supplement and a non-supplemented control.

The results of these tests are set forth below in Table 3. The compost used in the tests was prepared from wheat straw (46,700 lb.) combined with chicken manure (20,000 lb.), cottonseed hulls (15,000 lb.), potassium sulfate (700 lb.), urea (300 lb.), soybean splits (3,500 lb.), and cottonseed meal (7,000 lb.). The completed compost was placed in 8 inch deep trays with four pounds of cottonseed vegetable oil per tray and pasteurized. After pasteurization, 4.2 pounds per tray of A. bisporus mushroom spawn was added to the compost in combination with the supplement materials shown in Table 3. Percent supplementation was based on 6.5 lb. of compost dry matter per square foot. All of the soybean product used had a particle size of −10+30 standard mesh, with approximately 1.25% Dowicide A.

Water was then added to the trays to raise the moisture level of the contents to approximately 70%. Next, the trays were placed in a controlled environment room having a relative humidity of 90-95%. The compost temperatures were maintained between 78°-82° F. After 13 days of spawn growth, a 1.75 inch layer of casing soil was applied to the compost surface and watered to capacity. The trays were then maintained in controlled environment rooms (65°-73° F.; 10,000 ppm $CO_2$) for 13 days followed by an abrupt air temperature and $CO_2$ shift to 60° F. and 800 ppm $CO_2$ to cause fruiting of the mushrooms. The trays were then placed in production rooms and harvested for four weekly flushes. The length of time involved was as follows: (a) phase I composting—56 days; (b) phase II composting—6 days; (c) spawn run—13 days; (d) case holding—13 days; and (e) harvesting—32 days. The following information was obtained:

TABLE 3

| Treatment | A. bisporus Strain* | Supplement Rate (%) | Average Total Yield (lb/ft²) |
|---|---|---|---|
| Unsupplemented Control | U-3 | 0 | 4.2 |
| Formaldehyde-Treated Soy Protein | U-3 | 3.9 | 4.6 |
| Formaldehyde-Treated Soy Protein | U-3 | 4 | 5.2 |
| Formaldehyde-Treated Soy Protein | U-3 | 4.1 | 4.9 |
| Formaldehyde-Treated Soy Protein | U-3 | 4.3 | 5.5 |
| Formaldehyde-Treated Soy Protein | U-3 | 5.7 | 5.1 |
| Formaldehyde-Treated Soy Protein | U-1 | 5.9 | 5.4 |
| Formaldehyde-Treated Soy Protein | U-3 | 6.2 | 5.7 |
| Invention Supplement | U-3 | 2.2 | 5.2 |
| Invention Supplement | U-3 | 2.3 | 5.6 |
| Invention Supplement | U-3 | 2.6 | 4.9 |
| Invention Supplement | U-3 | 2.9 | 5.6 |
| Invention Supplement | U-1 | 3.5 | 5.5 |
| Invention Supplement | U-3 | 3.6 | 5.3 |
| Invention Supplement | U-1 | 4 | 5.6 |
| Invention Supplement | U-1 | 4.5 | 5.4 |

*Received from Amfac Amycel, Inc.

As with all tests involving biological systems, the above results are subject to slight experimental variablity. However, taking experimental variability into account, the present invention performed effectively in enhancing mushroom growth in comparison with the unsupplemented control and the commercially available formaldehyde-treated product. The invention was able to effect the promotion of mushroom growth without the costs and safety disadvantages required with denaturation processes, including those involving formaldehyde.

Having now fully described the invention, it will be apparent to one of ordinary skill in the art that many changes and modifications can be made thereto without departing from the spirit or scope of the invention as set forth herein. Specifically, various operating and production parameters of the invention may be slightly modified within the scope of the invention when used to promote the growth of other commercial mushroom varieties. Furthermore, it is contemplated that the present invention can be combined with other nutrient/growth enhancer materials to form a composite product. The present invention, and its attendant benefits, are defined by the following claims as set forth herein:

We claim:

1. A method for producing a mushroom growth enhancer comprising the steps of:
   providing comminuted soybean materials having a particle size of about −10+30 U.S. standard mesh;
   adding a preservative agent to said comminuted soybean materials; and
   pasteurizing said comminuted soybean materials and preservative agent by applying heat thereto in an amount sufficient to destroy undesired foreign microorganisms therein, but insufficient substantially to denature said comminuted soybean materials.

2. The method of claim 1 wherein said comminuted soybean materials prior to said adding of said preservative agent contain not more than about 2% hulls by weight.

3. The method of claim 1 wherein said preservative agent comprises a preservative compound selected from the group consisting of copper sulfate, methyl 1-(butylcarbamoyl)-2-benzimidazolecarbamate, zinc ethylenebisdithiocarbamate, o-Phenylphenol, o-Benzyl-para-chlorophenol, a salt of o-Phenylphenol, and a salt of o-Benzyl-para-chlorophenol.

4. The method of claim 1 wherein said applying of heat involves raising the temperature of said comminuted soybean materials and preservative agent to a temperature of 220° F. for about 5 minutes.

5. The method of claim 1 further comprising the steps of:
   evaporating water from said preservative agent and comminuted soybean materials after said heating; and
   cooling said preservative agent and comminuted soybean materials after said evaporating of said water.

6. The method of claim 5 further comprising the step of combining said mushroom growth enhancer with mushroom compost after said cooling thereof.

7. The method of claim 5 wherein said cooling of said preservative agent and comminuted soybean materials occurs over a time period of about 1.0–2.0 minutes, reducing said temperature to about 100° F.

8. A method for producing mushroom growth enhancer comprising the steps of:
   providing comminuted soybean materials having a particle size of $-10+30$ U.S. standard mesh;
   adding a preservative agent to said comminuted soybean materials, said preservative agent comprising a preservative compound selected from the group consisting of copper sulfate, methyl 1-(butylcarbamoyl)-2-benzimidazolecarbamate, zinc ethylenebisdithiocarbamate, o-Phenylphenol, o-Benzyl-parachlorophenol, a salt of o-Phenylphenol, and a salt of o-Benzyl-para-chlorophenol;
   mixing said preservative agent and said comminuted soybean materials to form a homogeneous mixture thereof;
   raising the temperature of said mixture to about 220° F. for about 5 minutes;
   evaporating moisture from said mixture after said raising of said temperature; and
   cooling said mixture to about 100° F. over a time period of about 1.0–2.0 minutes.

9. The method of claim 8 further comprising the step of combining said mushroom growth enhancer with mushroom compost.

10. A mushroom growth composition comprising mushroom compost and a mushroom growth enhancer, said enhancer comprising:
    a substantially undenatured particulate soybean product having a particle size of about $-10+30$ U.S. standard mesh, in combination with a preservative agent to form a growth enhancing mixture, said mixture being pasteurized by the application of heat in an amount sufficient to destroy undesired foreign microorganisms, but insufficient substantially to denature said particulate soybean product.

11. The mushroom growth composition of claim 10 wherein said composition comprises about 3.5% by weight mushroom growth enhancer.

12. The mushroom growth composition of claim 11 wherein said growth enchaner is pasteurized at a temperature of about 220° F. for about 5 minutes.

13. A method for growing mushrooms comprising propagating said mushrooms in mushroom growth composition comprising mushroom compost and a mushroom growth enhancer, said mushroom growth enhancer comprising a substantially undenatured particulate soybean product having a particle size of about $-10+30$ U.S. standard mesh, in combination with a preservative agent to form a growth enhancing mixture, said mixture being pasteurized by the application of heat in an amount sufficient to destroy undesired foreign microorganisms, but insufficient substantially to denature said particulate soybean product.

* * * * *